US012791132B2

(12) United States Patent
You et al.

(10) Patent No.: US 12,791,132 B2
(45) Date of Patent: Nov. 10, 2026

(54) FLOATING CONNECTOR

(71) Applicant: PURPLE CLOUD DEVELOPMENT PTE. LTD., Singapore (SG)

(72) Inventors: Weihua You, Hui Zhou City (CN); Yi-Ching Lin, Taipei City (TW)

(73) Assignee: PURPLE CLOUD DEVELOPMENT PTE. LTD., Singapore (SG)

( * ) Notice: Subject to any disclaimer, the term of this patent is extended or adjusted under 35 U.S.C. 154(b) by 0 days.

(21) Appl. No.: 19/551,292

(22) Filed: Feb. 26, 2026

(65) Prior Publication Data

US 2026/0287101 A1 Sep. 24, 2026

(30) Foreign Application Priority Data

Mar. 21, 2025 (CN) ......................... 202510349640.1

(51) Int. Cl.

| | |
|---|---|
| ***F16L 37/50*** | (2006.01) |
| ***F16C 29/00*** | (2006.01) |
| ***F16L 27/08*** | (2006.01) |

(52) U.S. Cl.

CPC ........ *F16L 27/0804* (2013.01); *F16C 29/002* (2013.01); *F16C 29/005* (2013.01); *F16C 2361/41* (2013.01)

(58) Field of Classification Search

CPC ......... F16L 37/50; F16L 37/505; F16L 37/52; H05K 7/20272

See application file for complete search history.

(56) References Cited

U.S. PATENT DOCUMENTS

| | | | | |
|---|---|---|---|---|
| 7,275,563 B2 * | 10/2007 | Tiberghien | .............. | F16L 29/04 251/149.6 |
| 9,351,428 B2 * | 5/2016 | Eckberg | .................. | F16L 37/34 |
| 11,746,942 B2 * | 9/2023 | Durieux | .................. | F16L 37/56 251/149.6 |
| 11,815,214 B2 * | 11/2023 | Nick | .................. | H05K 7/20781 |
| 11,892,252 B2 * | 2/2024 | Yang | .................. | H05K 7/20772 |

(Continued)

FOREIGN PATENT DOCUMENTS

| | | |
|---|---|---|
| CN | 223639577 U | 12/2025 |
| CN | 224097101 U | 4/2026 |
| TW | I866775 B | 12/2024 |

OTHER PUBLICATIONS

European Search Report issued in Application No. 26164496.7 mailed Aug. 25, 2026.

(Continued)

*Primary Examiner* — Aaron M Dunwoody

(74) *Attorney, Agent, or Firm* — Merchant & Gould P.C

(57) ABSTRACT

A connection structure includes a connector with a male head at one end. The connector includes a first connecting section, an intermediate section, and a second connecting section that are sequentially connected. The connection structure also includes a movable assembly that is sleeved on the intermediate section of the connector. The movable assembly defines a movable range for the connector. When the male head is mated with a corresponding female head, the movable assembly allows the connector to move within the movable range along at least one predetermined direction to facilitate engagement between the male head and the female head. The second connecting section is configured to connect to a conduit.

20 Claims, 8 Drawing Sheets

(56) References Cited

U.S. PATENT DOCUMENTS

| | | | | |
|---|---|---|---|---|
| 12,173,826 | B2 * | 12/2024 | Shende | F16L 37/367 |
| 12,241,698 | B2 * | 3/2025 | Lin | F16L 27/0804 |
| 12,247,685 | B2 * | 3/2025 | Marquis | F16L 37/52 |
| 12,372,179 | B1 * | 7/2025 | Tseng | H05K 7/20272 |
| 12,404,959 | B1 * | 9/2025 | Hsu | F16L 27/12 |
| 12,486,932 | B1 * | 12/2025 | Tseng | F16L 27/12 |
| 12,504,108 | B1 * | 12/2025 | Hsu | F16L 3/18 |
| 12,523,324 | B1 * | 1/2026 | Lin | F16L 3/20 |
| 12,560,265 | B1 * | 2/2026 | Hsu | F16L 37/22 |
| 2022/0349503 | A1 * | 11/2022 | Durieux | F16L 37/02 |
| 2022/0412496 | A1 * | 12/2022 | Nick | F16L 37/52 |
| 2023/0048859 | A1 * | 2/2023 | Lin | F28F 9/0258 |
| 2023/0050005 | A1 * | 2/2023 | Yang | F28F 9/0251 |
| 2023/0143344 | A1 * | 5/2023 | Marquis | F16L 37/52 285/261 |
| 2023/0184363 | A1 * | 6/2023 | Marquis | F16L 37/30 285/261 |
| 2024/0077160 | A1 * | 3/2024 | Zhang | F16L 37/56 |
| 2024/0125418 | A1 * | 4/2024 | Shende | F16L 27/04 |
| 2024/0414870 | A1 | 12/2024 | Wu et al. | |
| 2024/0414872 | A1 * | 12/2024 | Wu | H05K 7/20772 |
| 2024/0414891 | A1 * | 12/2024 | Wu | H05K 7/20772 |
| 2025/0081393 | A1 * | 3/2025 | Wu | H05K 7/20781 |
| 2025/0109814 | A1 * | 4/2025 | Pettersson | F16L 37/367 |
| 2026/0009603 | A1 * | 1/2026 | Hsu | F16L 37/50 |

OTHER PUBLICATIONS

Office Action issued in the corresponding Chinese Patent Application No. 202520520183.3, Aug. 12, 2026.

* cited by examiner

FLOATING CONNECTOR

CROSS-REFERENCE TO RELATED APPLICATIONS

This application claims priority to Chinese Application No. 2025103496401, filed on Mar. 21, 2025, which is incorporated herein by reference in its entirety.

TECHNICAL FIELD

The present disclosure relates to a connector that is capable of movement in different directions.

BACKGROUND

Connectors can function similarly to couplings. During operation, such a connector not only reduces assembly misalignment and insertion resistance but also protect connected components. In certain applications, a connector is employed to connect a male head with a corresponding female head.

Traditionally, a connector's balance or alignment precision is typically insufficient during use, resulting in unstable connection between the male and the female heads. As a result, impact may occur during engagement, leading to leakage or functional failure of the mating connectors. Accordingly, the deficiencies described above remain to be addressed.

SUMMARY

In general terms, this disclosure is directed to a floating connector. In some embodiments, and by non-limiting example, the present disclosure provides a floating connector that ensures accurate alignment and mating between a male head and a female head, while reducing friction therebetween during engagement.

In one aspect, the present disclosure provides a connection structure. The connection structure includes a connector having a male head at one end. The connector includes a first connecting section, an intermediate section, and a second connecting section that are sequentially connected. The connection structure also includes a movable assembly sleeved on the intermediate section of the connector. The movable assembly defines a movable range for the connector. When the male head is mated with a corresponding female head, the movable assembly allows the connector to move within the movable range along at least one predetermined direction to facilitate engagement between the male head and the female head. The second connecting section is configured to connect to a conduit.

In some embodiments, the movable assembly includes a housing through which the connector extends. The housing includes a top portion having an open end closer to the first connecting section and a bottom portion having a through hole closer to the second connecting section. The movable assembly includes an L-shaped guide rod that has a transverse portion and a vertical portion connected to one another. The vertical portion is sleeved on the intermediate section and the transverse portion extends substantially parallel to an axial direction of the connector. The movable assembly further includes an eccentric structure disposed in the housing. The eccentric structure contacts the vertical portion and collaborate with the vertical portion to define an eccentric movement range. The movable assembly also includes an axial structure disposed at the bottom portion of the housing. The axial structure defines an axial movement range.

In some embodiments, an axial movement range can be set to approximately 2 mm along an axial direction of the connector.

In some embodiments, the connector is movable within the eccentric movement range and the axial movement range by the L-shaped guide rod.

In some embodiments, the eccentric movement range includes movement in a first direction and a second direction, and the axial movement range includes movement in a third direction.

In some embodiments, the through hole is in communication with the open end, and the intermediate section extends through the through hole.

In some embodiments, the axial structure includes an elastic member disposed within the housing. The axial structure also includes a sliding plate disposed on an outer surface of the bottom portion of the housing. The sliding plate surrounds the intermediate section. The axial structure includes a spacer sleeved on a first stepped portion of the intermediate section. The spacer contacts the sliding plate. The axial structure further includes a fastener sleeved on a second stepped portion of the intermediate section, the fastener contacting the spacer.

In some embodiments, the axial movement range is defined by collaboration between the elastic member and the fastener.

In some embodiments, a height of the fastener is less than a height of the second stepped portion.

In some embodiments, a receiving recess is formed on the outer surface of the bottom portion of the housing, and the sliding plate is at least partially received in the receiving recess and is substantially coplanar with the outer surface.

In some embodiments, he eccentric structure includes a pressing plate sleeved on the elastic member and two rollers spaced apart on the pressing plate and contacting the vertical portion of the L-shaped guide rod.

In some embodiments, the eccentric movement range is approximately 2 mm along an axial direction or a radial direction of the rollers.

In some embodiments, the rollers cooperate with the vertical portion to allow movement of the connector along either an axial direction or a radial direction of the rollers.

In some embodiments, the vertical portion includes two sliding grooves formed on a side surface facing away from the connector, and portions of the two rollers are respectively received in the two sliding grooves.

In some embodiments, a width of each sliding groove is greater than a diameter of the corresponding roller.

Another aspect of the present disclosure provides a movable assembly in a connection system. The movable assembly includes a housing defining an internal space, a connector extending through the housing, a guide structure coupled to the connector and configured to guide relative movement of the connector with respect to the housing, an eccentric structure disposed in the housing and operatively coupled to the guide structure to allow the connector for lateral displacement, and an axial structure disposed in the housing and operatively coupled to the guide structure to allow the connector for axial displacement.

In some embodiments, the guide structure includes an L-shaped guide rod having a vertical portion coupled to the connector and a transverse portion extending substantially parallel to an axial direction of the connector.

In some embodiments, the eccentric structure includes at least one roller to engage with the guide structure.

In some embodiments, the axial structure includes an elastic member disposed in the housing.

In some embodiments, the movable assembly allows the connector to move in multiple directions relative to the housing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
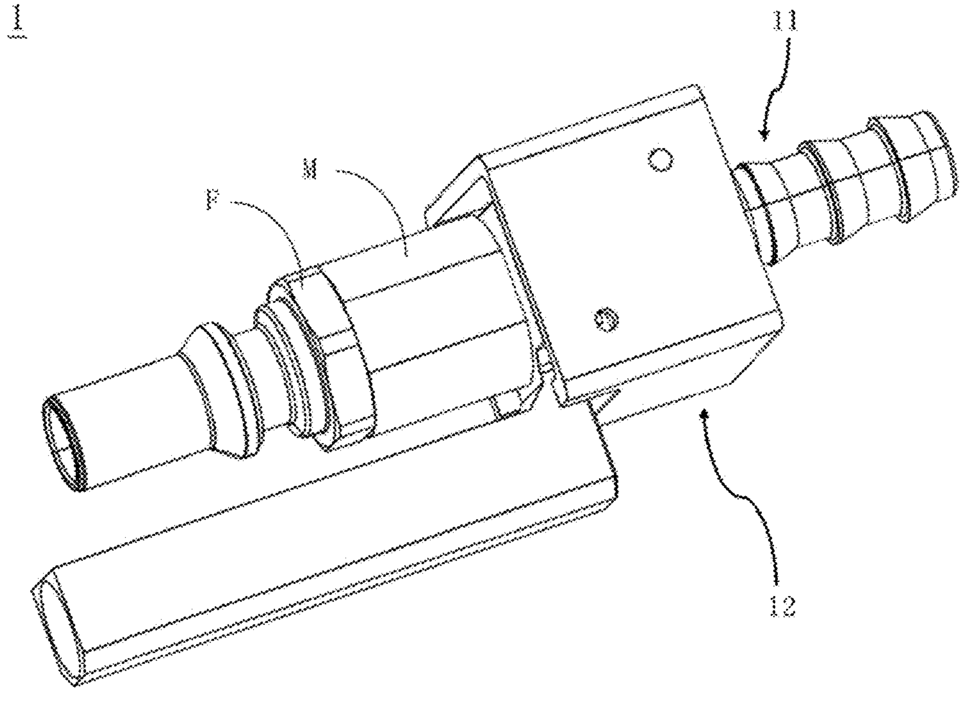
FIG. 1 is a perspective view of a connection structure in accordance with the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
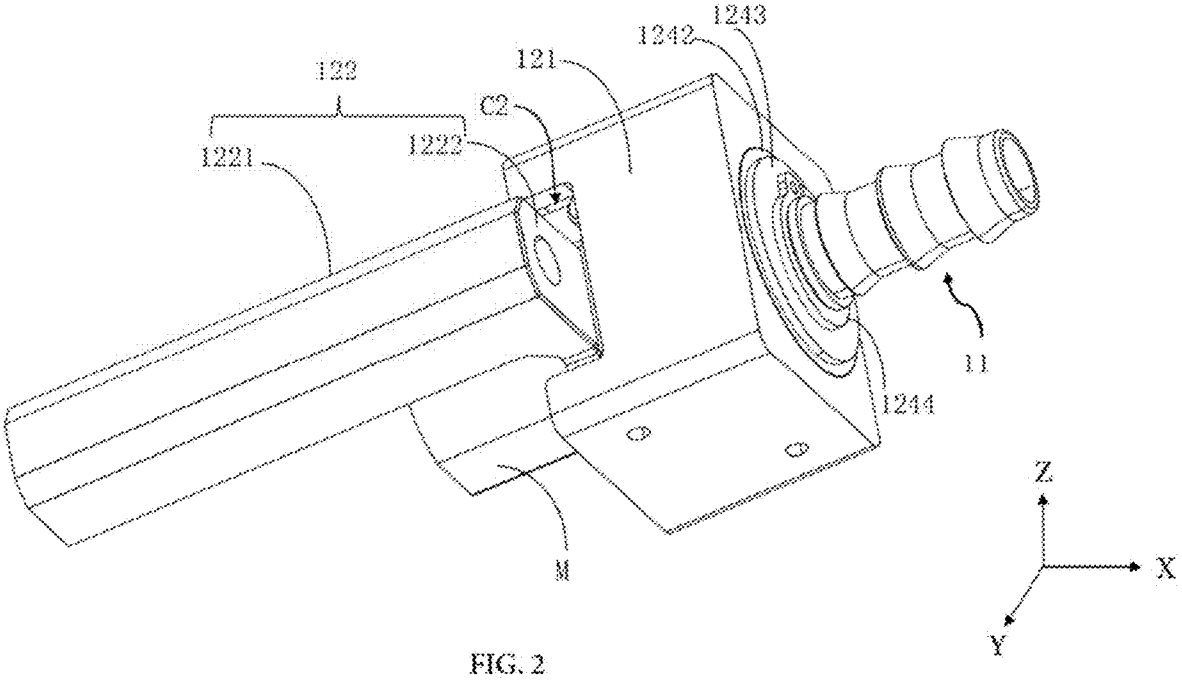
FIG. 2 is a perspective view of the connection structure of FIG. 1 viewed from another angle.
Figure 3:
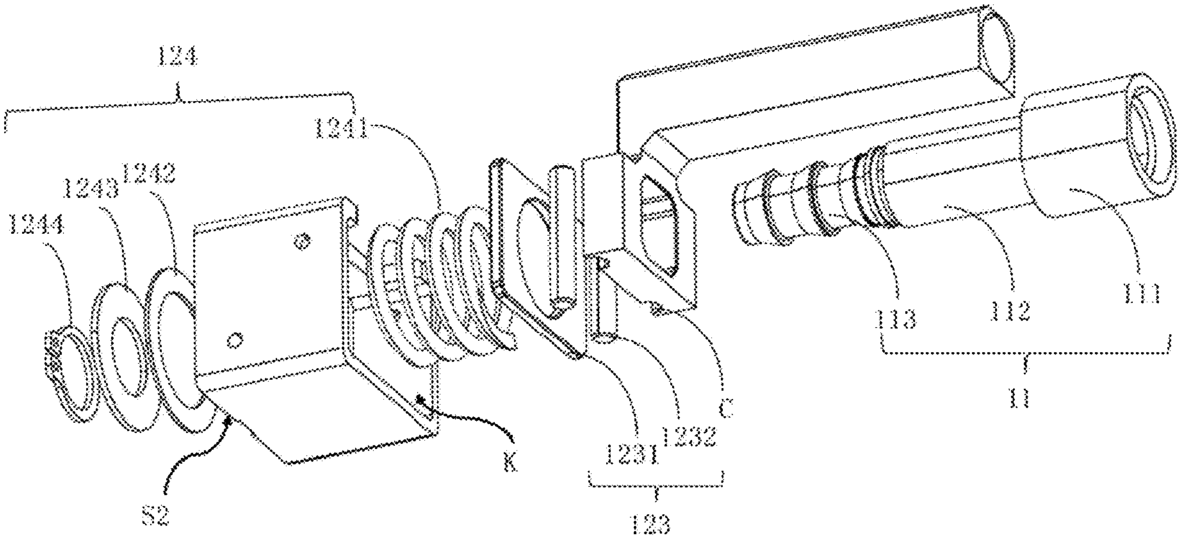
FIG. 3 is an exploded view of the connection structure of FIG. 1.

Referring to FIGS. 1-2, FIG. 1 is a perspective view of a connection structure in accordance with the present disclosure. FIG. 2 is a perspective view of the connection structure of FIG. 1 viewed from another angle. As an example shown in FIG. 1, the connection structure 1 includes a connector 11 and a movable assembly 12.

In some embodiments, the connector 11 includes a male head M disposed at one end thereof. The movable assembly 12 is fitted onto the connector 11 and defines a movable range for the connector 11. During operation, when the male head M is mated with a corresponding female head F, the movable assembly 12 enables the connector 11 to move in predetermined directions within the movable range, allowing for a smooth connection with the female head F.

Figure 6:
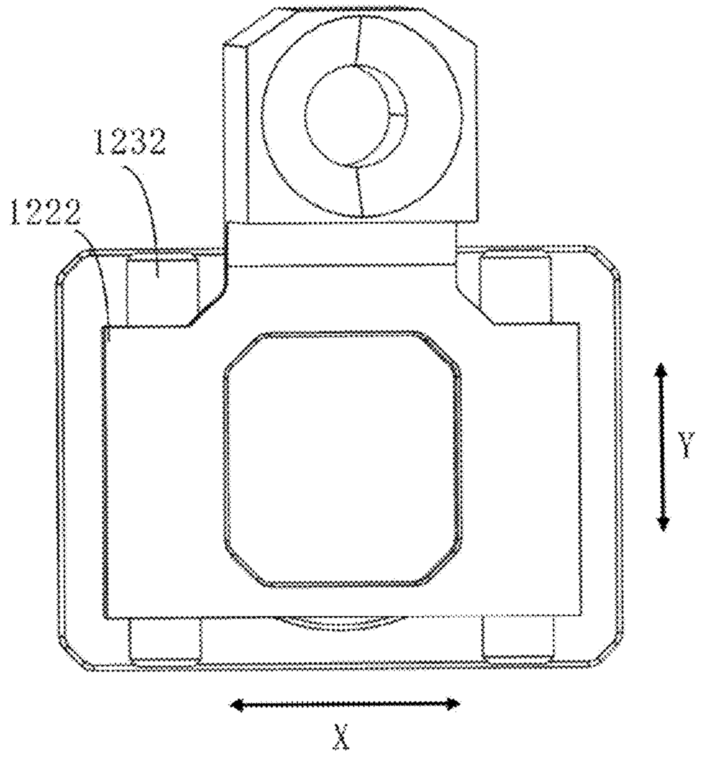
FIG. 6 is a schematic view illustrating movement of the connection structure in X and Y directions.
Figure 7:
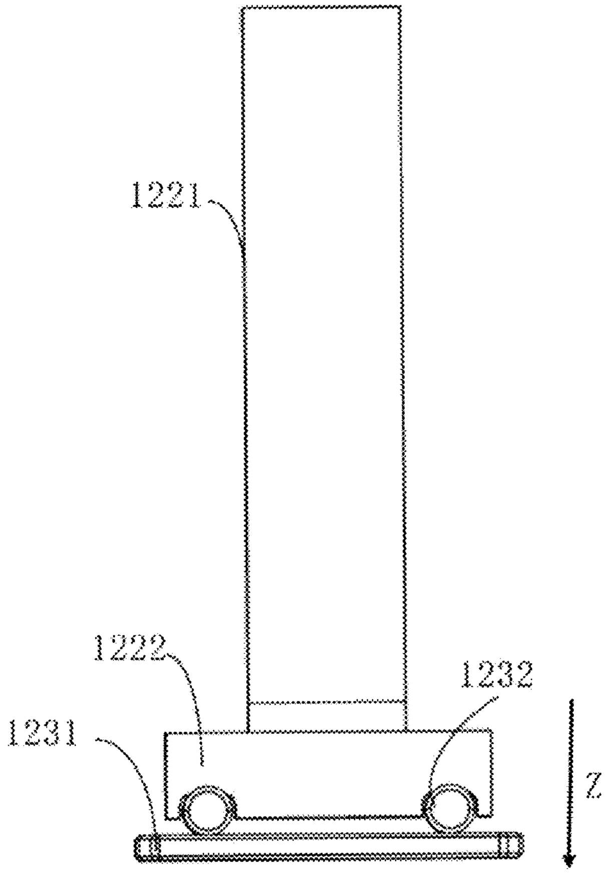
FIG. 7 is a schematic view illustrating movement of the connection structure in a Z direction.

In some embodiments, the movable range includes movement in the X direction, Y direction (shown in FIG. 6), and Z direction (shown in FIG. 7). As used herein, the X and Y directions are transverse to an axial direction of the connector, and the Z direction corresponds to the axial direction. This multi-directional mobility allows the male head M to adjust its position in three dimensions throughout the mating process, enabling precise alignment and engagement with the female head F.

According to the embodiments described above, when the initial assembly position is misaligned, the movable assembly 12 provides synchronous correction to properly align the male head M with the female head F. This self-alignment capability reduces friction between the male head M and the female head F during mating, thereby minimizing wear and extending the service life of the connection structure.

Figure 4:
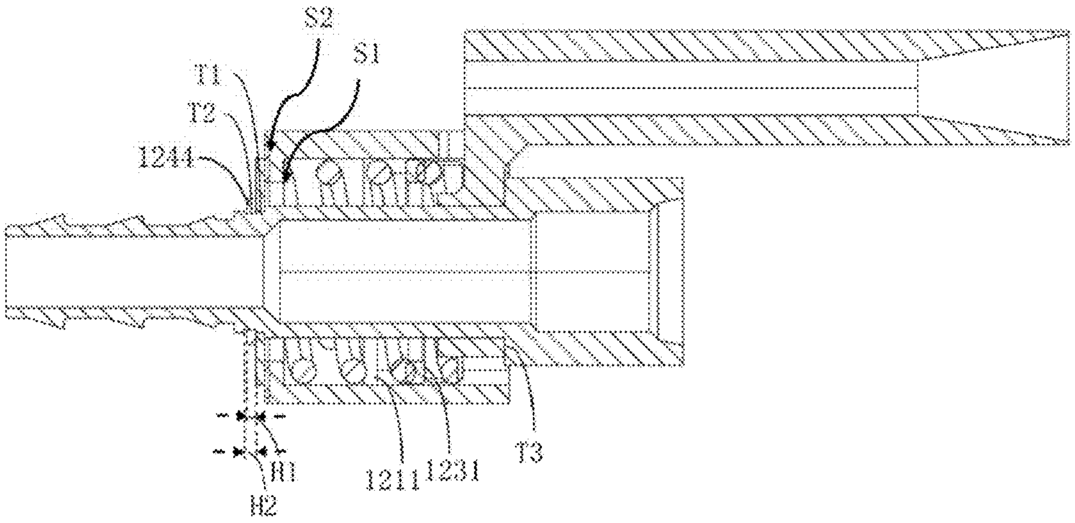
FIG. 4 is a cross-sectional view of the connection structure of FIG. 1 taken from one perspective.
Figure 5:
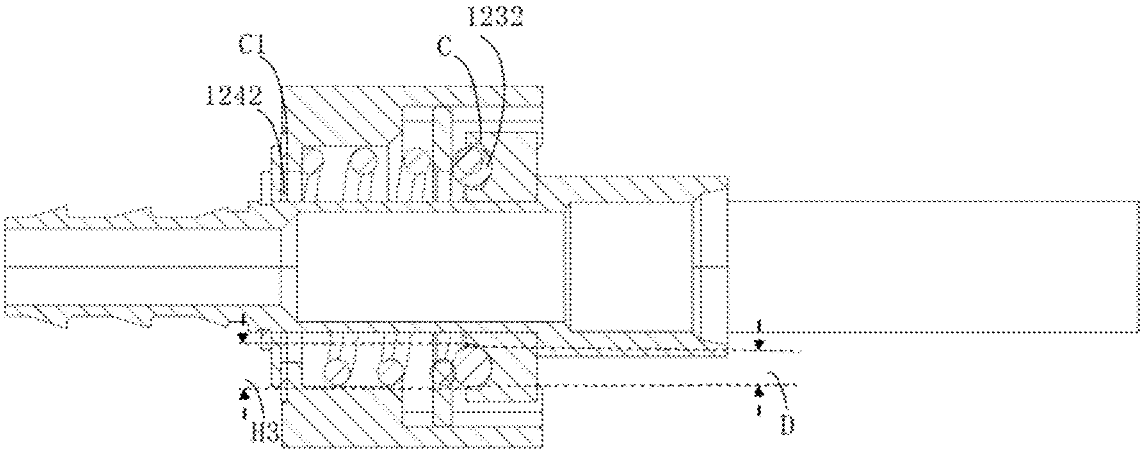
FIG. 5 is a cross-sectional view of the connection structure of FIG. 1 taken from another perspective.
Figure 8:
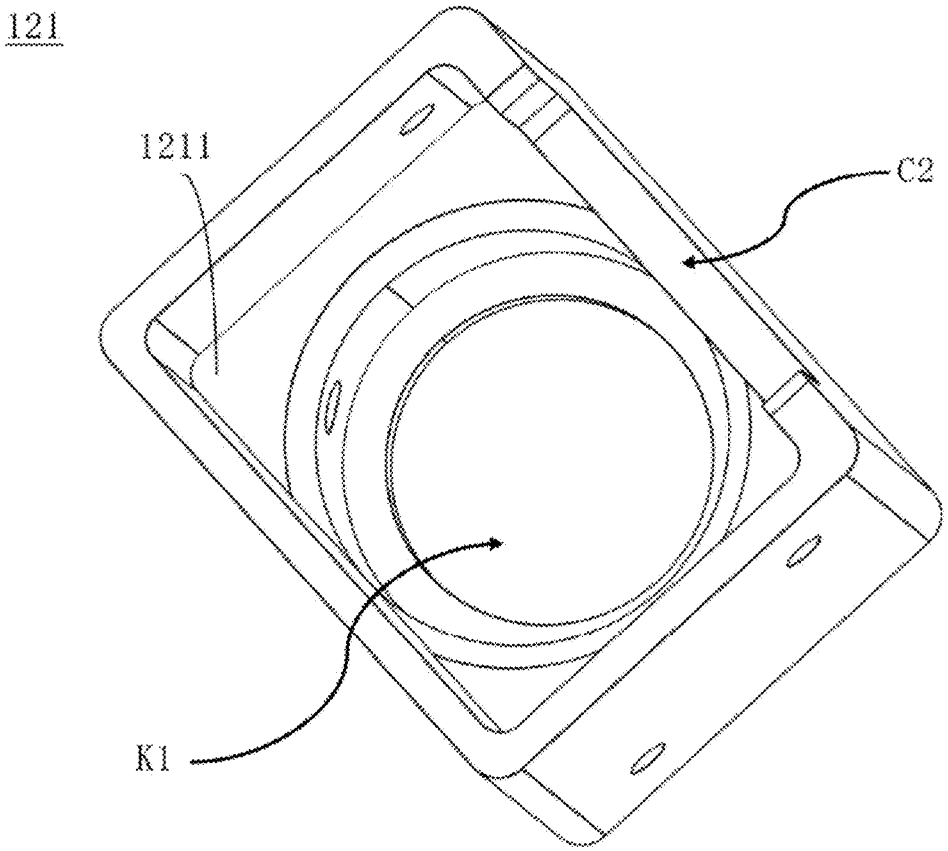
FIG. 8 is a schematic view illustrating an internal structure of a housing of the connection structure in accordance with the present disclosure.

Referring to FIGS. 3-8, FIG. 3 is an exploded view of the connection structure of FIG. 1. FIG. 4 is a cross-sectional view of the connection structure of FIG. 1 taken from one perspective. FIG. 5 is a cross-sectional view of the connection structure of FIG. 1 taken from another perspective. FIG. 6 is a schematic view illustrating movement of the connection structure in X and Y directions. FIG. 7 is a schematic view illustrating movement of the connection structure in a Z direction. FIG. 8 is a schematic view illustrating an internal structure of a housing of the connection structure in accordance with the present disclosure.

As shown in FIGS. 3 through 8, the connector 11 includes a first connecting section 111, an intermediate section 112, and a second connecting section 113 that are sequentially connected along an axial direction. The first connecting section 111 is provided with the male head M, the movable assembly 12 is sleeved onto the intermediate section 112, and the second connecting section 113 is configured for connection to a conduit or pipeline.

In some embodiments, the first connecting section 111 is integrally formed with the male head M as one piece. However, the embodiment is not limited thereto. In other embodiments, the male head can be a separate and independent component from the first connecting section 111.

In some embodiments, and with reference to FIG. 2, the movable assembly 12 includes a housing 121, an L-shaped guide rod 122, an eccentric structure 123, and an axial structure 124. The connector 11 extends through the housing 121, and the intermediate section 112 is positioned within the housing 121. The L-shaped guide rod 122 includes a transverse portion 1221 and a vertical portion 1222 connected to one another. The vertical portion 1222 is sleeved onto the intermediate section 112, and the transverse portion 1221 extends substantially parallel to the axial direction of the connector 11.

In some embodiments, the eccentric structure 123 is disposed within the housing 121 and abuts the vertical portion 1222 of the L-shaped guide rod 122. Cooperation between the eccentric structure 123 and the vertical portion 1222 defines an eccentric movement range, allowing the connector 11 to move within the eccentric movement range via the L-shaped guide rod 122. The axial structure 124 is disposed at the bottom portion of the housing 121 and defines an axial movement range. The axial structure 124 engages with the L-shaped guide rod 122, allowing the connector 11 to move within the axial movement range.

In some embodiments, the eccentric movement range include displacement in X and Y directions, and the axial movement range includes displacement in a Z direction. In other words, allowable movement of the connector 11 along the X and Y directions collectively forms the eccentric movement range, and allowed movement of the connector 11 along the Z direction together forms the axial movement range. Consequently, the connector 11 is capable of multi-axis floating movement to account for positional misalignment during engagement.

In some embodiments, the housing 121 includes an open end K closer to the first connecting section 111, which is a top portion of the housing 121, along the axis direction of the connector 11. The housing 121 further includes a through hole K1 on another end of the housing closer to the second connecting section 113, which is a bottom portion of the housing 121, along the axis direction of the connector 11. The through hole K1 is in communication with the open end K. The intermediate section 112 extends through the through hole K1.

In some embodiments, the axial structure 124 includes an elastic member 1241, a sliding plate 1242, a spacer 1243, and a fastener 1244. The elastic member 1241 is disposed within the housing 121 and has one end that abuts an inner surface S1 of the bottom portion of the housing 121. The elastic member 1241 has an opposite end that abuts the eccentric structure 123. The sliding plate 1242 is mounted on an outer surface S2 of the bottom portion of the housing 121 and surrounds the intermediate section 112. The spacer 1243 is sleeved onto a first stepped portion T1 of the intermediate section 112 and is positioned in contact with one side of the sliding plate 1242. The fastener 1244 is sleeved onto a second stepped portion T2 of the intermediate section 112 and abuts the spacer 1243.

The collaboration between the elastic member 1241 and the fastener 1244 allows the connector 11 to move along its axial direction within the designated axial movement range. In some embodiments, a height H1 of the fastener 1244 is less than a height H2 of the second stepped portion T2, thereby establishing a restriction on axial displacement to ensure secure retention of the connector 11.

In some embodiments, a receiving recess C1 is formed on the outer surface S2 of the bottom portion of the housing 121. The sliding plate 1242 is partially submerged within the receiving recess C1 and is substantially coplanar with the outer surface S2. As a result, a compact profile and minimal external interference can be maintained.

In some embodiments, an axial movement range can be set to approximately 2 mm along an axial direction of the connector 11. However, the axial movement range is not limited thereto and may be adjusted according to design requirements.

In some embodiments, the eccentric structure 123 includes a pressing plate 1231 and two rollers 1232. The pressing plate 1231 is sleeved onto the elastic member 1241, and the two rollers 1232 are spaced apart on the pressing plate 1231 and are in contact with the vertical portion 1222 of the L-shaped guide rod 122. The collaboration between the vertical portion 1222 and the rollers 1232 defines the scope of the eccentric movement range, allowing the connector 11 to move along either an axial direction or a radial direction of the rollers 1232.

In some embodiments, an eccentric movement range can be set to approximately 2 mm along either an axial direction or a radial direction of the rollers 1232. However, the eccentric movement range is not limited thereto and may be adjusted according to design requirements.

In some embodiments, one end of the intermediate section 112, adjacent to the first connecting section 111, includes a third stepped portion T3, on which the vertical portion 1222 of the L-shaped guide rod 122 is sleeved. Two sliding grooves C are formed on one side surface of the vertical portion 1222 facing away from the connector 11, with the two sliding grooves C spaced apart from one another. Portions of the two rollers 1232 are respectively received within the two sliding grooves C, thereby guiding rolling contact. A width H3 of each sliding groove C is greater than a diameter D of the corresponding roller 1232, allowing for regulated lateral displacement.

In some embodiments, the housing 121 includes a limiting portion 1211 formed on an inner side thereof and surrounding the elastic member 1241. The pressing plate 1231 is disposed on the limiting portion 1211, restricting the connector 11 from moving in a maximum travel distance of the pressing plate 1231 via the limiting portion 1211 to prevent excessive movement during operation.

In some embodiments, a notch C2 is further formed on one side surface of the housing 121. The notch C2 provides clearance for the vertical portion 1222 of the L-shaped guide rod 122, allowing relative movement of the L-shaped Guide Rod 122 while avoiding interference with the housing 121.

According to the connection structure of the present disclosure, axial guide movement and rolling-based eccentric movement are employed to minimize friction between interfacing components. Therefore, when the male head is advanced, a more seamless engagement with the female head occurs, preventing impact damage to the female head and avoiding leakage or functional failure.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. Of course, the disclosed embodiments are merely exemplary embodiments and that various modifications can be made without departing from the spirit and scope of the disclosure. Further, it should be understood that various aspects of the embodiment are not mutually exclusive of each other and can be combined as desired by a person of ordinary skill in the art as a matter of design choices.

The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:

1. A connection structure, comprising:

a connector having a male head at one end, the connector including a first connecting section, an intermediate section, and a second connecting section that are sequentially connected; and a movable assembly sleeved on the intermediate section of the connector, the movable assembly defining a movable range for the connector and including an L-shaped guide structure, wherein, when the male head is mated with a corresponding female head, the movable assembly allows the connector to move within the movable range along at least one predetermined direction to facilitate engagement between the male head and the female head, and the second connecting section is configured to connect to a conduit.

2. The connection structure of claim 1, wherein the movable assembly comprises:

a housing through which the connector extends, the housing including a top portion having an open end closer to the first connecting section and a bottom portion having a through hole closer to the second connecting section;

an L-shaped guide rod serving as the L-shaped guide structure, the L-shaped guide rod including a transverse portion and a vertical portion connected to one another, the vertical portion being sleeved on the intermediate section and the transverse portion extending substantially parallel to an axial direction of the connector;

an eccentric structure disposed in the housing, the eccentric structure contacting the vertical portion and collaborating with the vertical portion to define an eccentric movement range; and an axial structure disposed at the bottom portion of the housing, the axial structure defining an axial movement range.

3. The connection structure of claim 2, wherein an axial movement range can be set to approximately 2 mm along an axial direction of the connector.

4. The connection structure of claim 2, wherein the connector is movable within the eccentric movement range and the axial movement range by the L-shaped guide rod.

5. The connection structure of claim 4, wherein the eccentric movement range includes movement in a first direction and a second direction, and the axial movement range includes movement in a third direction.

6. The connection structure of claim 2, wherein the through hole is in communication with the open end, and the intermediate section extends through the through hole.

7. The connection structure of claim 2, wherein the axial structure comprises:

an elastic member disposed within the housing;

a sliding plate disposed on an outer surface of the bottom portion of the housing, the sliding plate surrounding the intermediate section;

a spacer sleeved on a first stepped portion of the intermediate section, the spacer contacting the sliding plate; and a fastener sleeved on a second stepped portion of the intermediate section, the fastener contacting the spacer.

8. The connection structure of claim 7, wherein the axial movement range is defined by collaboration between the elastic member and the fastener.

9. The connection structure of claim 7, wherein a height of the fastener is less than a height of the second stepped portion.

10. The connection structure of claim 7, wherein a receiving recess is formed on the outer surface of the bottom portion of the housing, and the sliding plate is at least partially received in the receiving recess and is substantially coplanar with the outer surface.

11. The connection structure of claim 7, wherein the eccentric structure comprises:

a pressing plate sleeved on the elastic member; and two rollers spaced apart on the pressing plate and contacting the vertical portion of the L-shaped guide rod.

12. The connection structure of claim 11, wherein the rollers cooperate with the vertical portion to allow movement of the connector along either an axial direction or a radial direction of the rollers.

13. The connection structure of claim 11, wherein the vertical portion includes two sliding grooves formed on a side surface facing away from the connector, and portions of the two rollers are respectively received in the two sliding grooves.

14. The connection structure of claim 13, wherein a width of each sliding groove is greater than a diameter of the corresponding roller.

15. The connection structure of claim 2, wherein the eccentric movement range is approximately 2 mm along an axial direction or a radial direction of the rollers.

16. A movable assembly in a connection system, the movable assembly comprising:

a housing defining an internal space;

a connector extending through the housing;

an L-shaped guide structure coupled to the connector and configured to guide relative movement of the connector with respect to the housing;

an eccentric structure disposed in the housing and operatively coupled to the guide structure to allow the connector for lateral displacement; and an axial structure disposed in the housing and operatively coupled to the guide structure to allow the connector for axial displacement.

17. The movable assembly of claim 16, wherein the L-shaped guide structure includes an L-shaped guide rod having a vertical portion coupled to the connector and a transverse portion extending substantially parallel to an axial direction of the connector.

18. The movable assembly of claim 16, wherein the eccentric structure includes at least one roller to engage with the guide structure.

19. The movable assembly of claim 16, wherein the axial structure includes an elastic member disposed in the housing.

20. The movable assembly of claim 16, wherein the movable assembly allows the connector to move in multiple directions relative to the housing.

* * * * *